US011395503B2

(12) United States Patent
Nguyen

(10) Patent No.: US 11,395,503 B2
(45) Date of Patent: Jul. 26, 2022

(54) PEARL SALT

(71) Applicant: GHL America LLC, Kent, WA (US)

(72) Inventor: Linh Hong Nguyen, Kent, WA (US)

(*) Notice: Subject to any disclaimer, the term of this patent is extended or adjusted under 35 U.S.C. 154(b) by 355 days.

(21) Appl. No.: 16/788,233

(22) Filed: Feb. 11, 2020

(65) Prior Publication Data

US 2021/0244062 A1 Aug. 12, 2021

(51) Int. Cl.
*A23L 33/16* (2016.01)
*A23L 27/40* (2016.01)

(52) U.S. Cl.
CPC ............... *A23L 33/16* (2016.08); *A23L 27/40* (2016.08)

(58) Field of Classification Search
CPC .................................. A23L 33/16; A23L 27/40
USPC ............................ 426/74, 520, 521, 648, 649
See application file for complete search history.

(56) References Cited

FOREIGN PATENT DOCUMENTS

| CN | 105219574 A | * | 1/2016 |
| CN | 103549367 | | 6/2016 |
| EP | 0221096 | | 9/1990 |
| KR | 10-2005 | * | 3/2007 |
| KR | 10-0697563 | * | 3/2007 |
| KR | 100697563 | | 3/2007 |
| KR | 20150068155 A | * | 6/2015 |

OTHER PUBLICATIONS

Medical Stone wholesale, "What is medical stone"?, pp. 1-3, http://www.mcreagents.com/product/59-en.html. (Year: 2022).*

* cited by examiner

*Primary Examiner* — Helen F Heggestad
(74) *Attorney, Agent, or Firm* — Volta Law Group

(57) ABSTRACT

The disclosure provides methods of producing a salt product which includes starting with a quantity of salt, placing the salt under an infrared light for a period of time, exposing the salt to sunlight for a period of time, exposing the salt to maifan stones for a period of time, and roasting the salt while being contained in clay pots that are surrounded with elements such as apatite, tourmaline, germanium, maifan (barley stone), volcanic rocks, titanium, and illite at high temperature for a period of time. The salt may include sea salt.

14 Claims, No Drawings

PEARL SALT

FIELD OF THE INVENTION

This disclosure is generally directed to salt including table salt, and more specifically, methods of preparing salt including table salt.

DESCRIPTION OF THE RELATED ART

Salt has been long known as a remedy for various ailments including an upset stomach. Salt, including treated salts and sea salt not only enhance food taste but may also increase the pH of a person's blood, and thereby neutralize acids in the blood from unhealthy foods; additionally, it can also enhances body's health by increasing antioxidant and minerals. Accordingly, methods of producing a salt product that can raise the pH of blood, antioxidant, and minerals are needed.

SUMMARY OF THE INVENTION

In one embodiment, the disclosure provides methods of producing a salt product which includes starting with a quantity of salt, placing the salt under infrared light for a period of time, exposing the salt to sunlight for a period of time, exposing the salt to maifan stones for a period of time, and roasting the salt while being contained in, for example, clay pots that are surrounded with elements such as Apatite, Tourmaline, Germanium, Maifan (Barley stone), Volcanic rocks, Titanium, and Illite at high temperature from 1000-1454F for a period of time. The salt may include sea salt.

Other features and aspects will be apparent from the following detailed description, the drawings, and the claims.

DETAILED DESCRIPTION

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

A method or producing a salt product is provided which includes the steps of starting with sea salt, exposing the sea salt to infrared light, exposing the sea salt to sunlight, exposing the salt to maifan stones, and then roasting the sea salt in clay pots that are surrounded with elements such as apatite, tourmaline, germanium, maifan (barley stone), volcanic rocks, titanium, and illite.

In embodiments, exposing the sea salt to infrared light may include artificial infrared light and exposure times of up to one month. In one preferred embodiment, the exposure to infrared light is for about one month.

In embodiments, exposing the sea salt to sunlight may occur simultaneously with exposing the salt to maifan stones. However, the salt may be exposed to sunlight and may be exposed to maifan stones independently as well. In one preferred embodiment, the sea salt is exposed to sunlight and maifan stones simultaneously for up to about three months. In another preferred embodiment, the sea salt is exposed to sunlight and maifan stones for about three months.

Maifan stones are strongly absorptive and are capable of removing heavy metals and other impurities and release minerals. The salt may be natural sea salt that contains higher than average pH. During the roasting of the salt, the salt may be placed in specialized pots and the roasting may be performed for up to seven days and seven nights continuously. In embodiments, the roasting is performed at about 1400-1454° F. for seven days and seven nights continuously.

In embodiments, the salt may be roasted a second time for up to 12 hours a day for up to seven days. In preferred embodiments, the salt may undergo a second roasting for 12 hours a day for seven days.

While this disclosure includes specific examples, it will be apparent after an understanding of the disclosure of this application has been attained that various changes in form and details may be made in these examples without departing from the spirit and scope of the claims and their equivalents.

What is claimed is:

1. A method of preparing a salt product comprising the steps of:
   selecting a quantity of salt;
   exposing the salt to infrared light;
   exposing the salt to sunlight;
   exposing the salt to maifan stones;
   placing the salt in a clay pot; and
   roasting the salt.

2. The method of claim 1, further including the step of surrounding the clay pot with minerals including one or more of apatite, tourmaline, germanium, maifan, volcanic rocks, titanium, and illite, in an oven.

3. The method of claim 1, wherein the salt is sea salt.

4. The method of preparing a salt product of claim 3, wherein the step of exposing the sea salt to sunlight is performed simultaneously with the step of exposing the sea salt to maifan stones.

5. The method of preparing a salt product of claim 4, wherein exposing the sea salt to sunlight and exposing the sea salt to maifan stones is performed for up to about three months.

6. The method of claim 1, wherein the infrared light is artificial infrared light.

7. The method of preparing a salt product of claim 1, wherein the step of exposing the salt to infrared light is performed for a period of up to one month.

8. The method of preparing a salt product of claim 7, wherein the step of exposing the salt to infrared light is performed for approximately one month.

9. The method of preparing the salt product of claim 1, wherein the step of roasting the salt is performed for up to about seven days.

10. The method of preparing a salt product of claim 9, wherein the step of roasting the salt is performed for approximately seven days.

11. The method of preparing a salt product of claim 1, wherein the roasting of the salt is performed at approximately 1000-1454° F.

12. The method of preparing a salt product of claim 11, wherein the second step of roasting the salt is performed for about 12 hours a day for about seven days.

13. The method of preparing a salt product of claim 1, further comprising a second step of roasting the salt.

14. The method of preparing a salt product of claim 13, wherein the second step of roasting the salt is performed for up to about 12 hours a day for up to seven days.

* * * * *